United States Patent
Zhang et al.

(10) Patent No.: US 10,143,963 B2
(45) Date of Patent: Dec. 4, 2018

(54) MERCURY REMOVAL SYSTEM FOR COAL-FIRED POWER PLANT

(71) Applicant: NORTH CHINA ELECTRIC POWER UNIVERSITY, Beijing (CN)

(72) Inventors: Yongsheng Zhang, Beijing (CN); Yongzheng Gu, Beijing (CN); Jiawei Wang, Beijing (CN); Zhao Liu, Beijing (CN); Weiping Pan, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 157 days.

(21) Appl. No.: 14/973,126

(22) Filed: Dec. 17, 2015

(65) Prior Publication Data

US 2016/0228810 A1 Aug. 11, 2016

(30) Foreign Application Priority Data

Feb. 9, 2015 (CN) .......................... 2015 1 0065290

(51) Int. Cl.
*B01D 53/10* (2006.01)
*B03C 3/017* (2006.01)
(Continued)

(52) U.S. Cl.
CPC .............. *B01D 53/64* (2013.01); *B01D 53/50* (2013.01); *B01D 53/83* (2013.01);
(Continued)

(58) Field of Classification Search
CPC ........ B01D 53/64; B01D 53/83; B01D 53/50; B01D 53/10; B01D 53/8625;
(Continued)

(56) References Cited

U.S. PATENT DOCUMENTS 3,656,666 A * 4/1972 Dugge ..................... B61D 7/16
222/556
5,505,766 A * 4/1996 Chang ................ B01D 46/0036
95/134
(Continued)

FOREIGN PATENT DOCUMENTS

CN 204661352 * 9/2015 ............... C02F 1/28
DE 1796018 A1 * 4/1971 ........... F27B 7/2025
JP 2012045465 * 3/2012 ............. B01D 53/64

*Primary Examiner* — Duane Smith
*Assistant Examiner* — Sonji Turner
(74) *Attorney, Agent, or Firm* — Hamre, Schumann, Mueller & Larson, P.C.

(57) ABSTRACT

The disclosure provides a mercury removal system for a coal-fired power plant comprising: a mercury content monitoring system configured to monitor a mercury concentration in flue gas; a fly ash collecting device configured to collect fly ash from an electrostatic precipitator in the coal-fired power plant; a modifying device configured to be supplied with the collected fly ash and prepare a mercury sorbent from the fly ash; a sorbent injector configured to inject the mercury sorbent into flues of the coal-fired power plant so as to mix and contact with the flue gas in the flue and adsorb the elemental mercury in the flue gas. Thus, the concentration of the mercury pollutant emission is decreased.

9 Claims, 1 Drawing Sheet

(51) Int. Cl.
*B01D 53/64* (2006.01)
*B01D 53/50* (2006.01)
*B01D 53/83* (2006.01)
*B01D 53/86* (2006.01)

(52) U.S. Cl.
CPC .... *B01D 53/8625* (2013.01); *B01D 2253/104* (2013.01); *B01D 2253/106* (2013.01); *B01D 2257/602* (2013.01); *B01D 2258/0283* (2013.01); *B03C 3/017* (2013.01)

(58) Field of Classification Search
CPC ......... B01D 2253/10; B01D 2253/104; B01D 2253/106; B01D 2258/283
USPC .............. 96/15, 18, 19; 95/134, 13; 110/345
See application file for complete search history.

(56) References Cited

U.S. PATENT DOCUMENTS

| | | | | |
|---|---|---|---|---|
| 6,712,878 B2 * | 3/2004 | Chang | ................... | B01D 53/02 95/107 |
| 6,719,828 B1 * | 4/2004 | Lovell | ................... | B01D 53/02 423/210 |
| 6,818,043 B1 * | 11/2004 | Chang | ................... | B01D 53/64 423/213.2 |
| 6,953,494 B2 * | 10/2005 | Nelson, Jr. | ............. | B01D 53/02 423/210 |
| 6,960,329 B2 * | 11/2005 | Sellakumar | ............ | B01D 53/64 423/210 |
| 7,381,379 B2 * | 6/2008 | Altman | .................. | B01D 46/50 422/172 |
| 7,704,921 B2 * | 4/2010 | Bool, III | .................. | B01J 20/20 502/417 |
| 8,644,961 B2 * | 2/2014 | Wroblewski | ......... | G05B 13/042 700/266 |
| 2004/0244657 A1 * | 12/2004 | Srinivasachar | ........ | B01D 53/10 110/345 |
| 2007/0180990 A1 * | 8/2007 | Downs | ................... | B01D 53/10 95/134 |
| 2008/0107579 A1 * | 5/2008 | Downs | ................... | B01D 53/10 423/210 |
| 2010/0200336 A1 * | 8/2010 | Hikita | .................... | B66B 5/021 187/247 |
| 2010/0300336 A1 * | 12/2010 | Thulen | ................... | B01D 53/10 110/345 |
| 2011/0289923 A1 * | 12/2011 | Bittner | ................... | B01D 53/10 60/670 |
| 2013/0034481 A1 * | 2/2013 | Dillon | ................... | B01D 53/83 423/210 |
| 2013/0139683 A1 * | 6/2013 | Hanson | ................. | B01D 53/08 95/1 |
| 2015/0068189 A1 * | 3/2015 | Sawatsubashi | ........... | C10J 3/50 60/39.12 |

\* cited by examiner

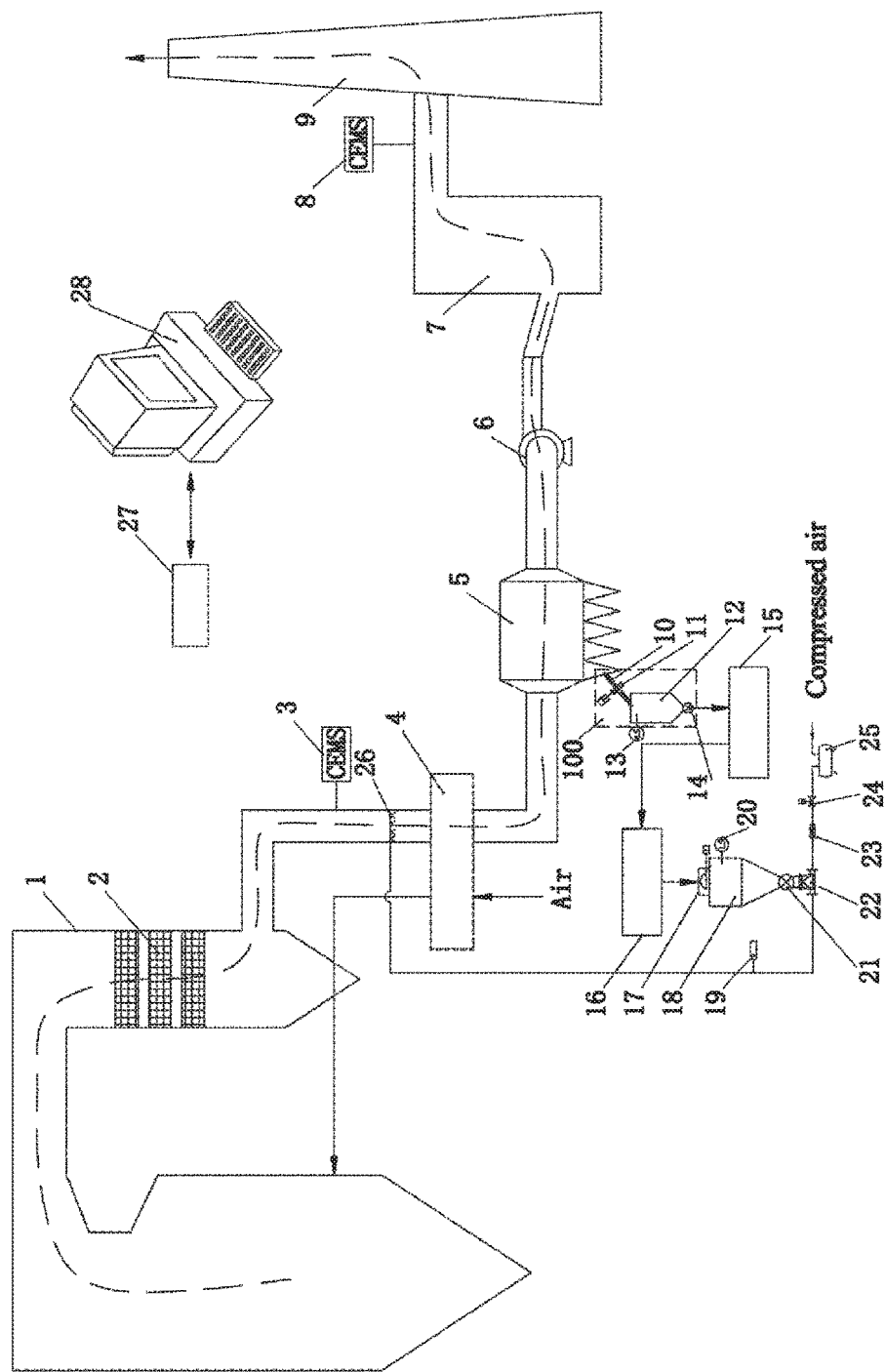

MERCURY REMOVAL SYSTEM FOR COAL-FIRED POWER PLANT

FIELD

The disclosure relates to a technical field of environment protection, in particular, to a mercury removal system for a coal-fired power plant which can remove the heavy metal mercury from the flue gas pollutant discharged from the coal-fired power plant.

DESCRIPTION OF THE RELATED ART

The heavy metal mercury (Hg) is highly volatile and toxic, has a stable chemical performance and is sustainably accumulated. Coal-fired power plant is a major source of atmospheric mercury emissions, and an adsorption by a sorbent is an effective method for reducing the mercury pollution in coal-fired power plant flue gas. In a conventional adsorption technology applied in the coal-fired power plant, the activated carbon is mostly used as the sorbent to treat flue gas pollutants discharged by the coal-fired power plant, so as to remove the heavy metal mercury from the flue gas pollutants. In practical application, the activated carbon is expensive and the injected activated carbon is disadvantageous to reuse the fly ash from the coal-fired power plant.

SUMMARY

In order to solve at least one of the above and other problems, embodiments of the present invention provide a mercury removal system for a coal-fired power plant.

In an embodiment of the present invention, the mercury removal system for a coal-fired power plant comprises: a mercury content monitoring system configured to monitor a mercury concentration in flue gas; a fly ash collecting device configured to collect fly ash from an electrostatic precipitator in the coal-fired power plant; a modifying device configured to be supplied with the collected fly ash and prepare a mercury sorbent from the fly ash; a sorbent injector configured to inject the mercury sorbent into flues of the coal-fired power plant so as to mix and contact with the flue gas in the flue and adsorb the elemental mercury in the flue gas.

The mercury removal system for a coal-fired power plant according to the embodiment of the present invention allows to collect the fly ash from flues of the coal-fired power plant and to prepare the sorbent to be injected from the fly ash in the coal-fired power plant field for adsorbing the mercury pollutants in the flue gas, avoiding to use expensive activated carbon sorbent and the transportation of the sorbent, thus the cost is saved.

BRIEF DESCRIPTION OF THE DRAWINGS

FIG. 1 is a schematic view of a mercury removal system disposed at a coal-fired power plant according to an embodiment of the present invention.

DETAILED DESCRIPTION OF EMBODIMENTS

Hereinafter, the specific implementations of the present invention will be described in detail in connection with embodiments accompanying drawings. The following embodiments is used for explaining the present invention, rather than limiting the scope of the present invention.

According to a general concept of the present invention, the mercury removal system for a coal-fired power plant comprises: a mercury content monitoring system configured to monitor a mercury concentration in flue gas; a fly ash collecting device configured to collect fly ash from an electrostatic precipitator in the coal-fired power plant; a modifying device configured to be supplied with the collected fly ash and prepare a mercury sorbent from the fly ash; a sorbent injector configured to inject the mercury sorbent into flues of the coal-fired power plant so as to mix and contact with the flue gas in the flue and adsorb the elemental mercury in the flue gas.

In addition, in the following detailed description, in order to facilitate the explanation, a number of specific details are explained to provide a comprehensive understanding to the embodiments disclosed in the disclosure. However, it is obvious that one or more embodiments may be implemented without these specific details. In other cases, conventional structures and devices are shown in schematic diagrams to simplify the drawings.

As shown in FIG. 1, a coal-fired power plant provided with the mercury removal system according to an embodiment of the present invention is illustrated, in which a portion of the coal-fired power plant is illustrated. The portion of the coal-fired power plant comprises a boiler 1, a SCR DeNOx(Selective catalytic reduction denitrification) reactor 2, an air preheater 4, an electrostatic precipitator 5, a draught fan 6, a desulfurization reactor 7 and a stack 9 which are connected to each other through flues, and flue gas produced by the coal-fired power plant is discharged from the stack 9.

The mercury removal system according to the embodiment of the present invention comprises: a mercury content monitoring system 3 configured to monitor a mercury concentration in flue gas; a fly ash collecting device 100 configured to collect fly ash from an electrostatic precipitator in the coal-fired power plant; a modifying device 15 configured to be supplied with the collected fly ash and prepare a mercury sorbent from the fly ash; a sorbent injector configured to inject the mercury sorbent into flues of the coal-fired power plant so as to mix and contact with the flue gas in the flue and adsorb the elemental mercury in the flue gas.

According to the embodiment, the mercury content monitoring system 3 is disposed at a flue upstream of the air preheater 4, for monitoring the mercury concentration in the flue gas before sorbent is injected, and then transferring the data obtained by the monitoring to a control system to control an operation of the mercury removal system. Further, a mercury content monitoring system 8 is disposed in a region in which a flue gas is discharged, for example, a region around the stack 9. The mercury content in the flue gas adsorbed by a modified fly ash sorbent may be obtained according to the mercury content in the flue gas monitored by the mercury content monitoring system 8. Thus, the control system may decide the effect of the flue gas treatment and determine whether to increase the amount of the sorbent to enhance the treatment based on the mercury concentrations in the flue gas monitored before and after the treatment by the sorbent.

According to the embodiment, the fly ash collecting device 100 is disposed below the electrostatic precipitator 5 to collect fly ash from the electrostatic precipitator 5.

According to the embodiment, the modifying device 15 may be a conventional modifying device, such as the SLG-3/300, SLG3/600, SLG-3/900 modifying machine produced by China, or the HSTM3/1000 modifying machine produced by the ABV Company of Switzerland. The collected fly ash is supplied to the modifying device 15, then is prepared into a mercury sorbent by the modifying device 15. Compared to the conventional modifying machines which are not produced for the mercury sorbent, a chemical modifying agent used in the modifying device according to the embodiment of the present invention is preferably a halogen compound.

The mercury removal system according to the embodiment of the present invention allows to collect the fly ash from flues of the coal-fired power plant and to prepare the sorbent from the fly ash in the coal-fired power plant field, avoiding to use expensive activated carbon sorbent and the transportation of them, thus the cost is saved.

Next, preferable embodiments of the present invention are further described with reference to FIG. 1.

The fly ash collecting device 100 is disposed between the modifying device 15 and the electrostatic precipitator 5, and it comprises a chute 10, a butterfly valve 11, a fly ash reservoir 12 and a rotary valve 14. The fly ash reservoir is configured to reserve the fly ash collected from the electrostatic precipitator.

The chute 10 and the butterfly valve 11 are disposed between the electrostatic precipitator and the fly ash reservoir 12, and the chute 10 provides a channel for the fly ash from the electrostatic precipitator into the fly ash reservoir, and the butterfly valve 11 is controlled to supply or stop supplying the fly ash into the fly ash reservoir.

The rotary valve 14 is disposed at an outlet of the fly ash reservoir and is controlled to supply the fly ash from the fly ash reservoir into the modifying device 15.

A volume of the fly ash reservoir 12 may be designed to meet the amount of modified fly ash and injected fly ash used in 3-4 hours. Moreover, those skilled in the art may also design the volume of the fly ash reservoir according to an operation requirement of the mercury removal system.

A fly ash amount detecting device 13 is disposed in the fly ash reservoir 12 for detecting the total amount of fly ash in the fly ash reservoir 12. The butterfly valve 11 is controlled to stop supplying the fly ash from the electrostatic precipitator into the fly ash reservoir 12 if the total amount of fly ash detected by the fly ash amount detecting device 13 is more than a maximum predefined value, and the butterfly valve 11 is controlled to supply the fly ash from the electrostatic precipitator into the fly ash reservoir 12 if the total amount of fly ash detected by the fly ash amount detecting device 13 is less than a minimum predefined value.

A stable fly ash supply may be ensured by using the rotary valve 14 and the butterfly valve 11, so that a continuous operation of the mercury removal system is ensured.

According to the embodiment, the mercury removal system further comprises a sorbent reservoir 16 into which the sorbent prepared by the modifying device 15 is supplied and which is configured to supply the sorbent to the sorbent injector.

The sorbent injector comprises: an injecting chamber 18 into which the sorbent is supplied from the sorbent reservoir 16; a valve 17 which is provided between the injecting chamber 18 and the sorbent reservoir 16 and configured to open and close a channel between the injecting chamber 18 and the sorbent reservoir 16; a compressed air reservoir 25 configured to supply compressed air to a sorbent outlet of the injecting chamber 18; an injector 26 which injects the sorbent into flues of the coal-fired power plant with the compressed air driving the sorbent to enter the injector 26 from the injecting chamber 18.

A hermetically sealing structure is provided in the valve 17. The fly ash contains silicon oxide and aluminum oxide, so that the hermetically sealing structure provided in the valve 17 may prevent a seal ring in the valve 17 from wearing and provide an operation stability for the system.

A mixer 22 and a control valve 21 are provided at the sorbent outlet of the injecting chamber 18. The control valve is configured to control the amount of the sorbent at the sorbent outlet and the mixer 22 is configured to facilitate mixing the compressed air and the sorbent.

According to the embodiment, a plurality of injecting chambers 18 may be arranged in serial or in parallel, and the injecting chamber 18 may be provided with a pressure balancing device therein, so that a pressure fluctuation during supplying the sorbent will be avoided and the operation stability of the mercury removal system will be ensured.

A gas flow regulating valve 24 and a gas flow monitor 23 are provided between the sorbent outlet of the ejecting chamber 18 and the compressed air reservoir 25. The gas flow regulating valve 24 is configured to regulate the flow of the compressed air and the gas flow monitor 23 is configured to monitor the flow of the compressed air.

A sorbent amount monitoring device 20 is provided in the injecting chamber 18 to monitor the amount of the sorbent in the injecting chamber.

A sorbent flow monitoring device 19 is provided in a channel between the injecting chamber 18 and the injector 26 to monitor the flow of the sorbent in the channel.

In the embodiment, as shown in FIG. 1, the mercury removal system further comprises controllers 27, 28 configured to control the operation of the mercury removal system based on signals from the mercury content monitoring system, the fly ash amount detecting device, the gas flow monitor, the sorbent amount monitoring device and the sorbent flow monitoring device. Specifically, different operating components, such as the butterfly valve, the gas flow regulating valve, the control valve and the like, may be controlled based on data obtained by different monitoring device. Operating parameters may be suitably set based on the amount of mercury in the flue gas and other requirements. Thus, the mercury removal system can remove the mercury from the flue gas effectively.

In the embodiment, the injector 26 is disposed downstream at the SCR DeNOx(Selective catalytic reduction denitrification) reactor 2, it comprises a main injecting pipe, a multi-channel distributor and a spray gun, so that a multi-outlet uniform injection of the sorbent at injecting points may be realized. In the embodiment, an injecting direction of the sorbent is consistent with a flow direction of the flue gas.

Though some embodiments according to the general concept of the present invention have been illustrated and described, it should be noted that those skilled in the art can make several modifications thereto without departing from the principle and spirit of the concept of the present invention, and the scope of the present invention should be defined by the appended claims and the equivalents thereof.

What is claimed is:

1. A mercury removal system for a coal-fired power plant including an electrostatic precipitator, the mercury removal system comprising:
   a mercury content monitoring system configured to monitor a mercury concentration in flue gas;
   a fly ash collector configured to collect fly ash from the electrostatic precipitator;
   a surface modification device configured to receive fly ash from the fly ash collector and modify a surface of the received fly ash to prepare a mercury sorbent comprising the fly ash;

a sorbent injector configured to inject the mercury sorbent into flues of the coal-fired power plant so as to mix and contact with a flue gas and adsorb elemental mercury in the flue gas, wherein the fly ash collector is disposed between the surface modification device and the electrostatic precipitator and comprises a chute, a butterfly valve, a fly ash reservoir and a rotary valve;

wherein the fly ash reservoir is configured to reserve the fly ash collected from the electrostatic precipitator;

the chute and the butterfly valve are disposed between the electrostatic precipitator and the fly ash reservoir, and the chute provides a channel for the fly ash from the electrostatic precipitator into the fly ash reservoir;

the butterfly valve is configured to supply or stop supplying the fly ash into the fly ash reservoir;

the rotary valve is disposed at an outlet of the fly ash reservoir and is configured to supply the fly ash from the fly ash reservoir into the surface modification device;

the mercury removal system further comprising a fly ash amount detecting device, disposed in the fly ash reservoir, for detecting the total amount of fly ash in the fly ash reservoir;

wherein the butterfly valve is configured to stop supplying the fly ash from the electrostatic precipitator into the fly ash reservoir if the total amount of fly ash detected by the fly ash amount detecting device is more than a maximum predefined value, and the butterfly valve is configured to supply the fly ash from the electrostatic precipitator into the fly ash reservoir if the total amount of fly ash detected by the fly ash amount detecting device is less than a minimum predefined value.

2. The mercury removal system according to claim 1, further comprising a sorbent reservoir into which the mercury sorbent prepared by the surface modification device is supplied and which is configured to supply the mercury sorbent to the sorbent injector.

3. The mercury removal system according to claim 2, wherein the sorbent injector comprises:

an injecting chamber into which the mercury sorbent is supplied from the sorbent reservoir, a valve being provided between the injecting chamber and the sorbent reservoir and being configured to open and close a channel between the injecting chamber and the sorbent reservoir;

a compressed air reservoir configured to supply compressed air to a sorbent outlet of the injecting chamber;

an injector which injects the sorbent into flues of the coal-fired power plant with the compressed air driving the sorbent to enter the injector from the injecting chamber.

4. The mercury removal system according to claim 3, wherein a mixer and a control valve are provided at the sorbent outlet of the injecting chamber, the control valve being configured to control an amount of the mercury sorbent at the sorbent outlet and the mixer being configured to facilitate mixing the compressed air and the sorbent.

5. The mercury removal system according to claim 3, wherein a gas flow regulating valve and a gas flow monitor are provided between the sorbent outlet of the injecting chamber and the compressed air reservoir, the gas flow regulating valve being configured to regulate the flow of the compressed air and the gas flow monitor being configured to monitor the flow of the compressed air.

6. The mercury removal system according to claim 3, wherein a sorbent amount monitoring device is provided in the injecting chamber to monitor an amount of the mercury sorbent in the injecting chamber.

7. The mercury removal system according to claim 3, wherein a sorbent flow monitoring device is provided in a channel between the injecting chamber and the injector to monitor flow of the mercury sorbent in the channel.

8. The mercury removal system according to claim 7, further comprising a controller configured to control operation of the mercury removal system based on signals from the mercury content monitoring system, a fly ash amount detecting device, a gas flow monitor, and the sorbent flow monitoring device.

9. The mercury removal system according to claim 1, wherein an injecting direction of the mercury sorbent is consistent with a flow direction of the flue gas.

* * * * *